May 23, 1933.　　　J. A. LEONARD　　　1,910,803
TRASH RACK RAKE
Filed Nov. 23, 1931
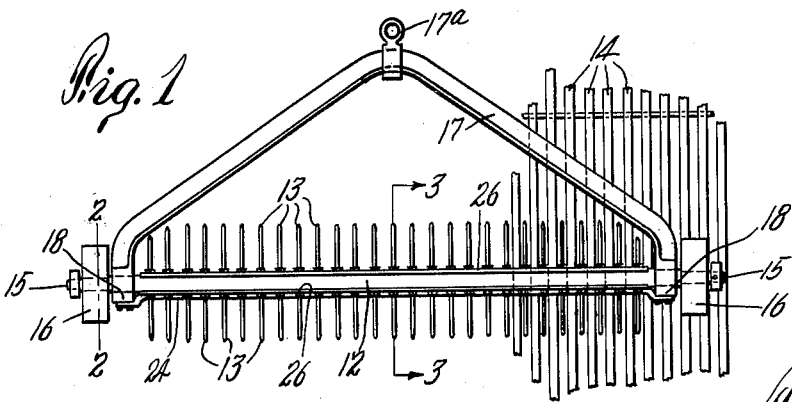
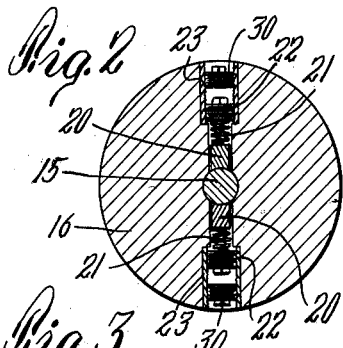
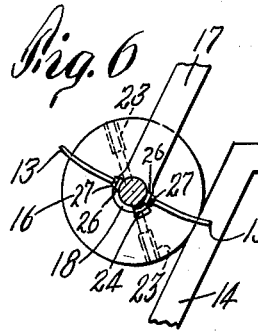
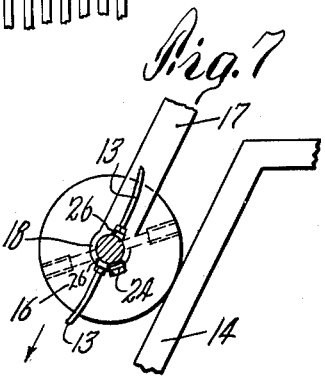
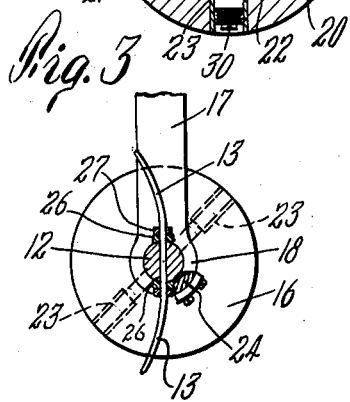
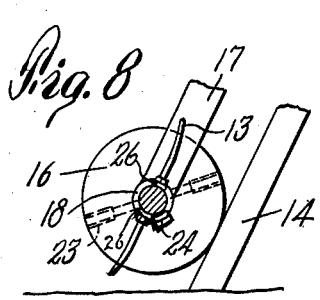
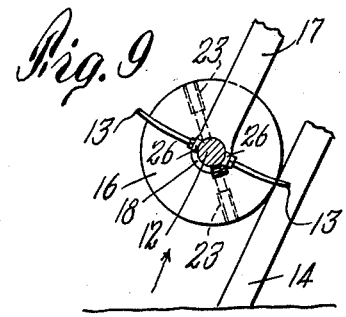
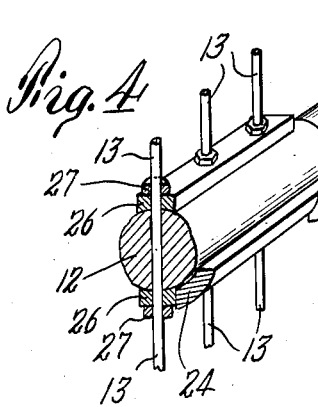
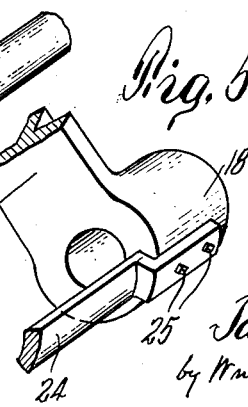
Inventor
James A. Leonard Patented May 23, 1933

1,910,803

UNITED STATES PATENT OFFICE

JAMES A. LEONARD, OF BANGOR, MAINE

TRASH RACK RAKE

Application filed November 23, 1931. Serial No. 576,696.

This invention relates to a rake employed to remove trash from a rack or grating placed across the intake end of a pump well, water wheel flume or a mill race to arrest matter which would otherwise be carried through the race and be objectionable for well known reasons.

A rake to which my invention relates comprises an elongated rake head, teeth projecting therefrom, axle arms at the ends of the head, wheels rotatably mounted on said arms and adapted to run on bars of a trash rack, and a bail operable to raise and lower the rack and provided with bearings in which the head is adapted to partially rotate to locate the teeth in an operative load-engaging position when the rake is rising, and in an inoperative position when the rake is falling, conditioning means being employed for maintaining the rake head with its teeth in a load-engaging position during the upward movement, and in an inoperative position during the downward movement.

For the proper operation of a rake of this character it should have sufficient weight to enable its teeth in descending to effectively engage débris in the path of the rake.

A rake of this character is disclosed in my application filed July 24, 1930, Serial No. 470,360, the conditioning means including positive stop members and springs yieldingly acting to cause the cooperation of said stop members.

The object of the present invention is to eliminate the use of springs in the conditioning means, and the liability of disability resulting from failure of such springs to properly function.

Of the accompanying drawing forming a part of this specification,—

Figure 1 is a side view of a trash rake embodying the invention, and a fragmentary side view of a trash rack.

Figure 2 is a section on line 2—2 of Figure 1.

Figure 3 is a section on line 3—3 of Figure 1.

Figure 4 is a fragmentary perspective view, showing a portion of the rake head.

Figure 5 is a fragmentary perspective view, showing a portion of the bail and a portion of a stop member attached thereto.

Figure 6 is an end view, showing the rake with its teeth in their operative load-carrying position, the rake being at the upper end of the rack.

Figure 7 is an end view, showing the rake commencing its downward movement, and the teeth moved to their inoperative position.

Figure 8 is an end view, showing the rake as it appears when reaching the extreme of its downward movement, the teeth being in their inoperative position.

Figure 9 is an end view, showing the rake partly raised from its extreme downward position, its teeth having been swung to their operative position during the initial upward movement of the rake.

The same reference characters indicate the same parts in all of the figures.

12 designates an elongated metal shaft constituting a rake head. Fixed to and projecting laterally from the head are teeth 13, preferably composed of stout metal rods adapted to enter spaces between the bars 14 of a trash rack.

On the opposite ends of the head are formed axle arms 15, on which are rotatably mounted wheels 16, adapted to run on bars of the rack.

17 designates a bail which is preferably a length of angle iron bent to a V-shape and operable to raise and lower the rake by a cable (not shown) connected with hoisting mechanism and with an eye 17a on the bail.

The ends of the bail are provided with bearings 18, in which the axle arms 15 are journalled.

The wheels 16 are engaged with the axle arms 15 by frictional means adapted to cause rotation of the rake head by the wheels when such rotation is unopposed, stop means hereinafter described being provided to oppose rotation of the head by the wheels after a limited rotation of the head.

Said frictional means preferably includes clutch members 20 movable in radial guiding bores in the wheels 16 and having end faces bearing on the axle arms 15 and springs 21 exerting inward pressure on the clutch members, the springs being backed by adjustable abutments 22 such as screw plugs engaged with internal threads in bushings 23 fixed in the guiding bores, the pressure of the springs on the clutch members being variable by rotation of the plugs. I have shown two clutch members in each wheel but am not limited as to the number of members.

The stop means above mentioned is preferably embodied in a fixed stop bar 24 (Figure 5) attached as by bolts 25 to and extending between the end portions of the bail formed by the bearings 18, the bar being beside the rake head 12, and stop bars 26 (Figure 4) attached to opposite sides of the rake head and movable by the head to alternately abut the fixed bar 24. The bars 26 may be attached to the head 12 by passing the teeth 13 through the head and bars, and engaging clamping nuts 27 with screw threads on the teeth, said nuts bearing in the stop bars as shown by Figure 4. Any other suitable means for securing the bars 26 and the rake teeth to the head may be employed.

The described stop means permits a limited rotation of the rake head by the wheels in either direction, and is organized to maintain the rake teeth alternately in an operative load lifting position shown by Figures 6 and 9, and in an inoperative position shown by Figures 3, 7, and 8.

When the rake is at the upper end of the rack and begins to descend, the teeth being substantially at right angles with the rack as shown by Figure 6, the rotation of the downwardly moving wheels causes the teeth to assume a position approximately parallel with the rack when the rake reaches the position shown by Figure 7. This position is maintained until the rake reaches the lower end of the rack as shown by Figure 8. During the upward movement of the rake from the position shown by Figure 8 to that shown by Figure 9, the rotation of the upwardly moving wheels causes the teeth to assume a position substantially at right angles with the rack, this position being maintained until the rake reaches the upper end of the rack as shown by Figure 6. During the intermediate upward and downward movements of the rake the wheels rotate independently, the rake head remaining in the positions determined by the stop means.

The preferred construction of each wheel 16 is as follows:

The wheel, preferably a metal casting, has a central bearing for an axle arm 15, and a radial bore extending from the periphery of the wheel to said bearing, the outer portion of said bore being enlarged to receive the bushing 23. Said bushing is of rustless material such as brass, and, as above stated, is internally threaded to engage the thread of the plug 22. To exclude water and other foreign matter from the plug 22 and the clutch member, I provide a sealing screw plug 30 engaged with the internal thread of the bushing 23. The clutch member 20 is preferably of a very hard and dense wood such as lignum vitæ, the qualities distinguishing this wood rendering it particularly desirable in a clutch member. The member 20 is preferably oblong, and the grain of the wood extends lengthwise. I prefer to elongate the rake teeth 13 and fix them to the head 12 so that they project equally from opposite sides of the head and impart a maximum carrying capacity to the rake.

It will be seen that the elements of the frictional means are not exposed, and are adapted to be adjusted by rotation of the screw plugs 22, to vary the pressure of the clutch members, and compensate for wear of said members.

I claim:

1. A trash rake comprising an elongated shaft constituting a rake head and provided with rake teeth and axle arms, wheels rotatable on the axle arms, and adapted to run on trash rack bars, a bail, operable to raise and lower the rake and having bearings for the axle arms, frictional means engaging the wheels with the axle arms and adapted to cause rotation of the rake head by the wheels when such rotation is unopposed, and stop means permitting a limited rotation of the rake head by the wheels in either direction, and organized to maintain the rake teeth alternately in an operative load-lifting position, and in an inoperative position, the arrangement being such that the wheels turn the teeth to an operative position during an initial upward movement of the rake, and to an inoperative position during an initial downward movement thereof, the wheels turning independently during the intermediate upward and downward movement of the rake.

2. A trash rake as specified by claim 1, said frictional means including brake members movable in radial guides in the wheels, and bearing on the axle arms, and means for varying the pressure of said members on the axle arms.

3. A trash rake as specified by claim 1, said stop means being embodied in a fixed stop bar attached to and extending between the bail ends beside the rake head, and stop bars attached to opposite sides of the rake head and movable by the head to alternately abut the fixed bar.

4. A trash rake comprising an elongated shaft constituting a rake head and provided with rake teeth and axle arms, wheels rotatable on the axle arms, and adapted to run on trash rack bars, a bail, operable to raise and lower the rake and having bearings for the axle arms, said wheels having central bearings for the axle arms, radial bores extending from the peripheries of the wheels to said bearings, clutch members movable in said bores and having end faces formed to bear on said axle arms, internally threaded rustless bushings fixed in the outer portions of said bores, screw plugs adjustably engaged with said bushings, springs interposed between the plugs and the clutch members, and adjustable by the plugs to vary the pressure of the clutch members on the axle arms, and compensate for wear, and sealing screw plugs engaged with the outer portions of the bushings to exclude foreign matter, the arrangement being such that the wheels turn the teeth to an operative position during an initial upward movement of the rake, and to an inoperative position during an initial downward movement thereof, the wheels turning independently during the intermediate upward and downward movements of the rake.

In testimony whereof I have affixed my signature.

JAMES A. LEONARD.